US005096195A

United States Patent [19]

Gimmon

[11] Patent Number: 5,096,195

[45] Date of Patent: Mar. 17, 1992

[54] ELECTRONIC GAMING APPARATUS

[75] Inventor: Eliyahu Gimmon, Haifa, Israel

[73] Assignee: Elbit Computers Ltd., Chof Hacarmel, Israel

[21] Appl. No.: 242,442

[22] Filed: Sep. 9, 1988

[51] Int. Cl.[5] .......................... A63F 9/00; G06F 15/44

[52] U.S. Cl. ............................ 273/138 A; 273/143 R; 273/DIG. 28; 364/412

[58] Field of Search ............... 273/138 A, 143 R, 1 E, 273/DIG. 28; 364/410, 412

[56] References Cited

U.S. PATENT DOCUMENTS

| | | | |
|---|---|---|---|
| 4,254,404 | 5/1981 | White | 273/138 A |
| 4,323,770 | 4/1982 | Dieulot et al. | 235/375 |
| 4,516,777 | 5/1985 | Nikora | 273/DIG. 28 |
| 4,636,951 | 1/1987 | Harlick | 273/138 A |
| 4,805,907 | 2/1989 | Hagiwara | 273/138 A |
| 4,848,771 | 7/1989 | Richardson | 273/237 |

FOREIGN PATENT DOCUMENTS

| | | | |
|---|---|---|---|
| 70613 | 1/1983 | European Pat. Off. | 273/138 A |
| 2182476 | 5/1987 | United Kingdom | 273/143 R |

*Primary Examiner*—William H. Grieb
*Assistant Examiner*—Sebastiano Passaniti
*Attorney, Agent, or Firm*—Benjamin J. Barish

[57] ABSTRACT

Electronic slot machine system comprises a central computer unit, and a plurality of portable game units, each including a credit memory for storing a predetermined credit available for playing, a manual operator manipulatable by the player for playing the game according to a predetermined amount, a computer for determining any winnings earned by playing the game and for updating the credit memory by the predetermined amount played and by any such winnings, and a display for displaying the results of the game played, the earnings if any, and the current amount in the credit memory. The central computer unit may be coupled to a selected one of the portable playing units to credit the memory of the coupled portable game unit with the predetermined credit available for playing, and to read out the current amount in the credit memory of the coupled portable game unit.

17 Claims, 8 Drawing Sheets

ELECTRONIC GAMING APPARATUS

BACKGROUND OF THE INVENTION

The present invention relates to electronic gaming apparatus. The invention is particularly applicable for electronic gaming apparatus simulating the slot machine game and is therefore described below with respect to this application, although it will be appreciated that the invention could be advantageously used in other electronic games as well.

The conventional slot machine game includes a plurality of reels arranged in a line and provided with various symbols on their outer peripheries. A start lever is manually pulled down and then released, which starts the reels to rotate. The reels stop successively one after the other in random positions, to display different symbols on their outer peripheries. Certain combinations of these symbols when arranged in a line represent winning combinations, earning the player predetermined amounts of money according to the winning combination produced in the line of reels.

Various types of electronic machines have been developed and are now in use simulating the slot machine game. Examples of such electronic slot machines are described in U.S. Pat. Nos. 4,573,681, 4,684,600, 4,624,459 and 4,335,809.

An object of the present invention is to provide a new type of electronic gaming apparatus. Another object of the invention is to provide a new type of electronic gaming apparatus particularly useful for simulating the slot machine game.

BRIEF SUMMARY OF THE INVENTION

According to the present invention, there is provided electronic gaming apparatus, comprising a central computer unit, and a plurality of portable game units. Each of the portable game units includes display means having a first display device displaying a plurality of lines of variable symbols; first key means for manually inputting a selected number of lines of symbols to be considered for a winning combination in a respective game; second key means for manually inputting a selected value to be played for each line; and a credit memory for storing a predetermined credit available for playing. Each portable game unit further includes computer means for randomly selecting the symbols to be displayed in the plurality of lines of the first display device, for determining any winnings earned by playing the game, and for updating the credit memory by the predetermined amount played and by any such winnings. The display means further includes a second display device for displaying the earnings if any as a result of the game played, and the current amount in the credit memory.

The central computer unit includes a connector for connecting it to a selected on of the portable game units when the game unit is not being played and for disconnecting it from the game unit when the game unit is being played, means for initially crediting the credit memory of a connected portable game unit with a predetermined credit available for playing, and means for reading out the current amount in the credit memory of a connected portable game unit.

In the preferred embodiment of the invention described below, each of the portable game units includes a rechargeable battery; and the central control unit is carried on a portable cart, which cart also includes means for supporting the plurality of portable game units, and recharging means for recharging their batteries when supported on the cart.

The foregoing features of the invention make the gaming apparatus particularly useful for occupying passengers in airplanes, trains, busses, ships or like vehicle during long trips, while at the same time providing an additional source of income to the transportation company. Thus, the cart used for supporting the central control unit and the plurality of portable game units could be dimensioned so as to be movable along the aisle of the vehicle to conveniently distribute the portable game units to any passengers who may wish to play the game during the trip.

In the preferred embodiment of the invention described below, each of the portable game units simulates the slot machine game.

According to another feature of the invention, there is provided an electronic gaming machine comprising a plurality of symbol field each including a plurality of symbols in the form of liquid-crystal display elements each selectively energizable to display one of the symbols. The symbol fields are arranged according to a two-dimensional array of horizontal and vertical lines, each of the lines simulating the symbols of a slot machine game. The gaming machine further comprises manual operator means, such as a handle, manipulatable by the player to play a game for randomly energizing one of the symbols in each of the plurality of symbol fields of at least one of the lines.

In the described preferred embodiment, the symbol fields are separated by a plurality of horizontal and vertical lines each including a liquid-crystal display element selectively energizable to indicate the line or lines of symbol fields to be considered for winning combination in the respective game.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Overall System

Figure 1:
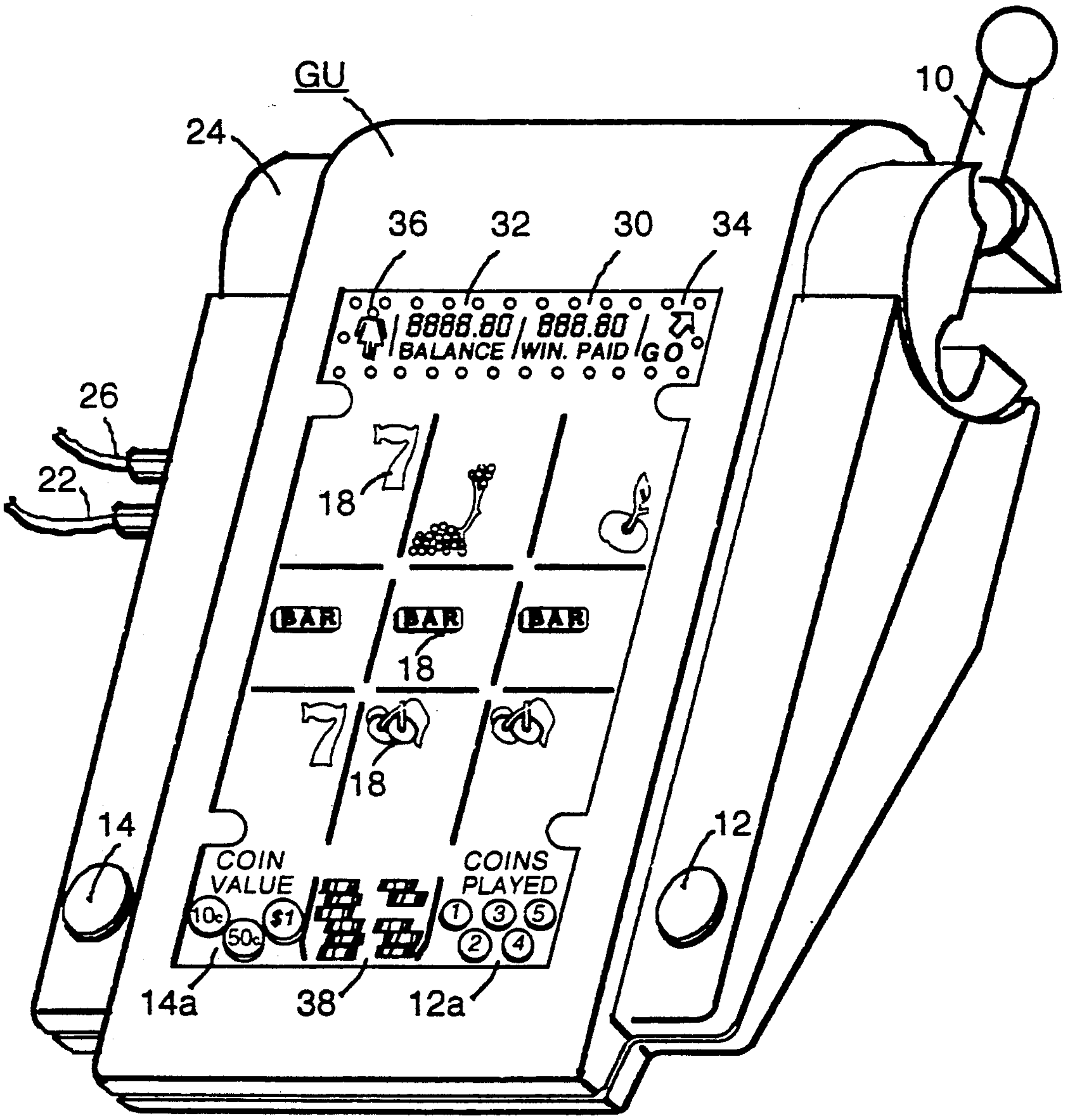
FIG. 1 illustrates one form of portable game unit included in an electronic gaming apparatus constructed in accordance with the present invention.

The gaming apparatus illustrated in the drawings is an electronic and coinless slot machine gaming system designed specifically for use on board long-range aircraft to occupy the passengers during the long trip and also to provide a source of revenue for the airline.

Figure 2:
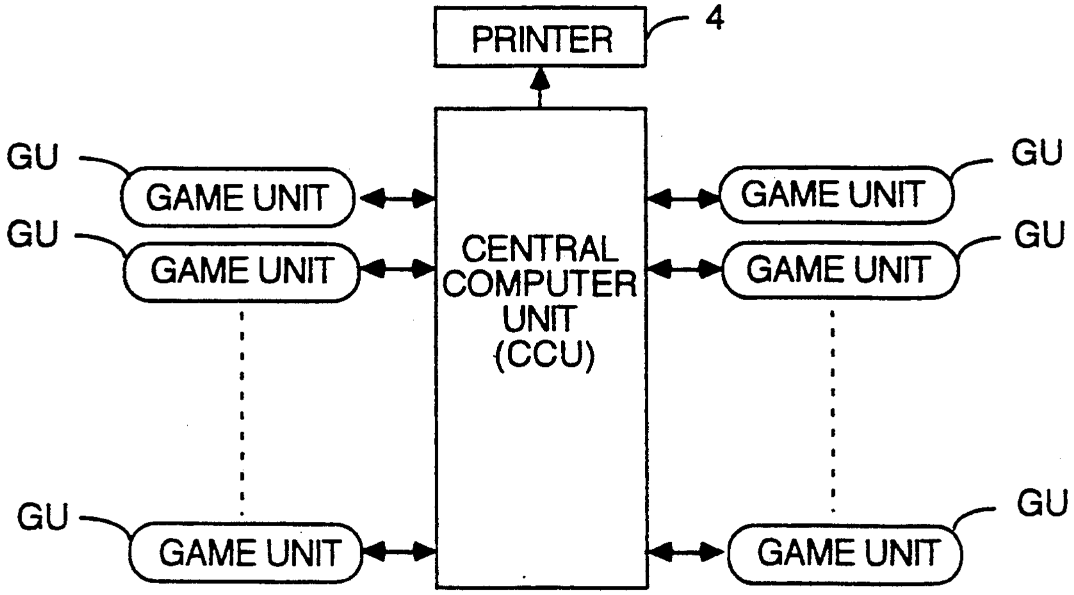
FIG. 2 is a block diagram schematically illustrating the overall electronic gaming apparatus constructed in accordance with the present invention, including a central computer unit and a plurality of portable game units each according to FIG. 1.
Figure 3:
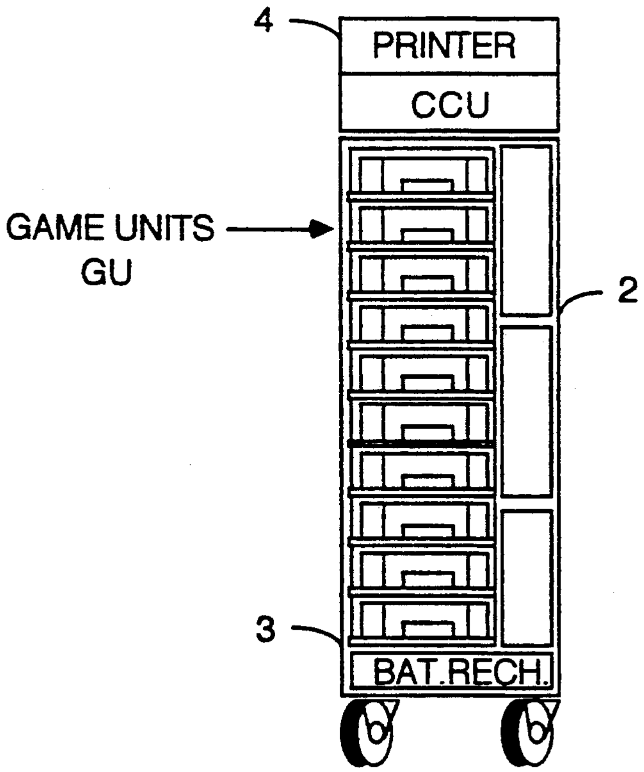
FIG. 3 illustrates the manner of supporting the central control unit and the plurality of portable game units on a cart when the apparatus is to be made available to airline passengers.

The illustrated apparatus comprises a central control unit, generally designated CCU, and a plurality of portable game units, each designated GU. When not in use, the portable game units GU are housed in a cart 2 (FIG. 3), which also, supports the central control unit CCU, and a battery recharger 3 which recharges the portable game units GU. The cart 2 also includes a printer 4 (FIG. 2) for printing out certain information as will be described more particularly below.

Cart 2 is of similar structure to that of the food serving carts used on airplanes, so that it may be wheeled along the aisle to distribute the portable game units GU to those passengers wishing to play the game. When not in use, the cart is stored in the galley or other location provided with a source of electrical power to recharge the portable game units.

Figure 4:
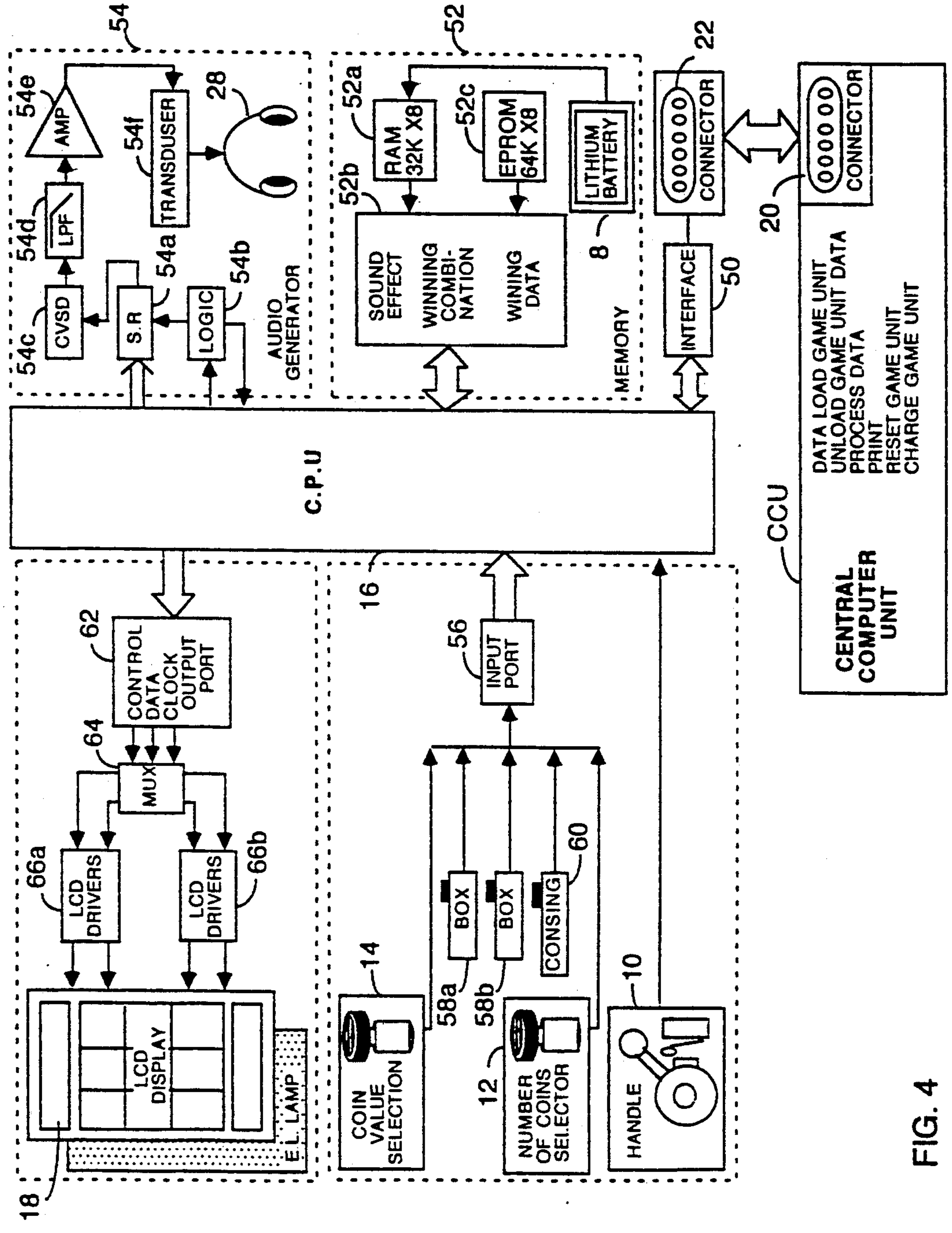
FIG. 4 is a block diagram schematically illustrating the main components of the central computer unit and one of the portable game units in the illustrated apparatus.

As schematically shown in FIG. 4, each of the portable game units GU includes a "rechargeable battery" 8 which supplies the power to the portable game unit. It also includes a manual operator, in the form of a pivotal handle 10 corresponding to the handle provided on a slot machine to be manipulated by the player for playing the game. Each game is played according to a predetermined amount as pre-selected by the player via keys 12 and 14 (FIGS. 1, 4). A credit memory (52*a*, FIG. 4, described below) is provided in each game unit GU for storing a predetermined credit available for playing, which credit is introduced into the unit initially from the central control unit CCU. Each game unit GU further includes a CPU (central processor unit) 16 for determining any winnings earned by the player and for updating the credit memory by the predetermined amount played and by any such winnings. A display 18 displays the results of the game played, the winnings if any, and the current amount in the credit memory.

As also shown schematically in FIG. 4, the central control unit CCU includes a connector 20 for connection to a connector 22 of each portable game unit GU for loading and unloading data with respect to such unit, for processing such data, for printing same, for resetting the game unit, and for recharging the normal battery supply 8.

Thus, when one of the portable game units GU is allocated to a passenger, the attendant first connects the game unit GU via connectors 20, 22 to the central computer unit CCU, and enters the amount collected from the passenger, the passenger's seat number, and other information. The serial number of the respective game unit GU is entered automatically upon the connection of the game unit to the central computer unit. The amount collected is entered as a credit into the credit memory of the game unit, thereby making such amount available for playing.

The portable game unit GU is disconnected from the central computer unit CCU and left with the passenger, who will then be able to begin to use the game unit for playing games until the credit has been exhausted, or until the player otherwise wishes to discontinue. At that time, the game unit GU is again reconnected to the central computer unit, which latter unit reads out the current amount in the credit memory, if any. If desired, the player may purchase further credit to enable the player to continue to play games, or may request a pay-out of the amount of the player's credit balance as appearing in the credit memory of the game unit GU and as displayed in its display.

The Portable Game Units (GU)

Figure 5:
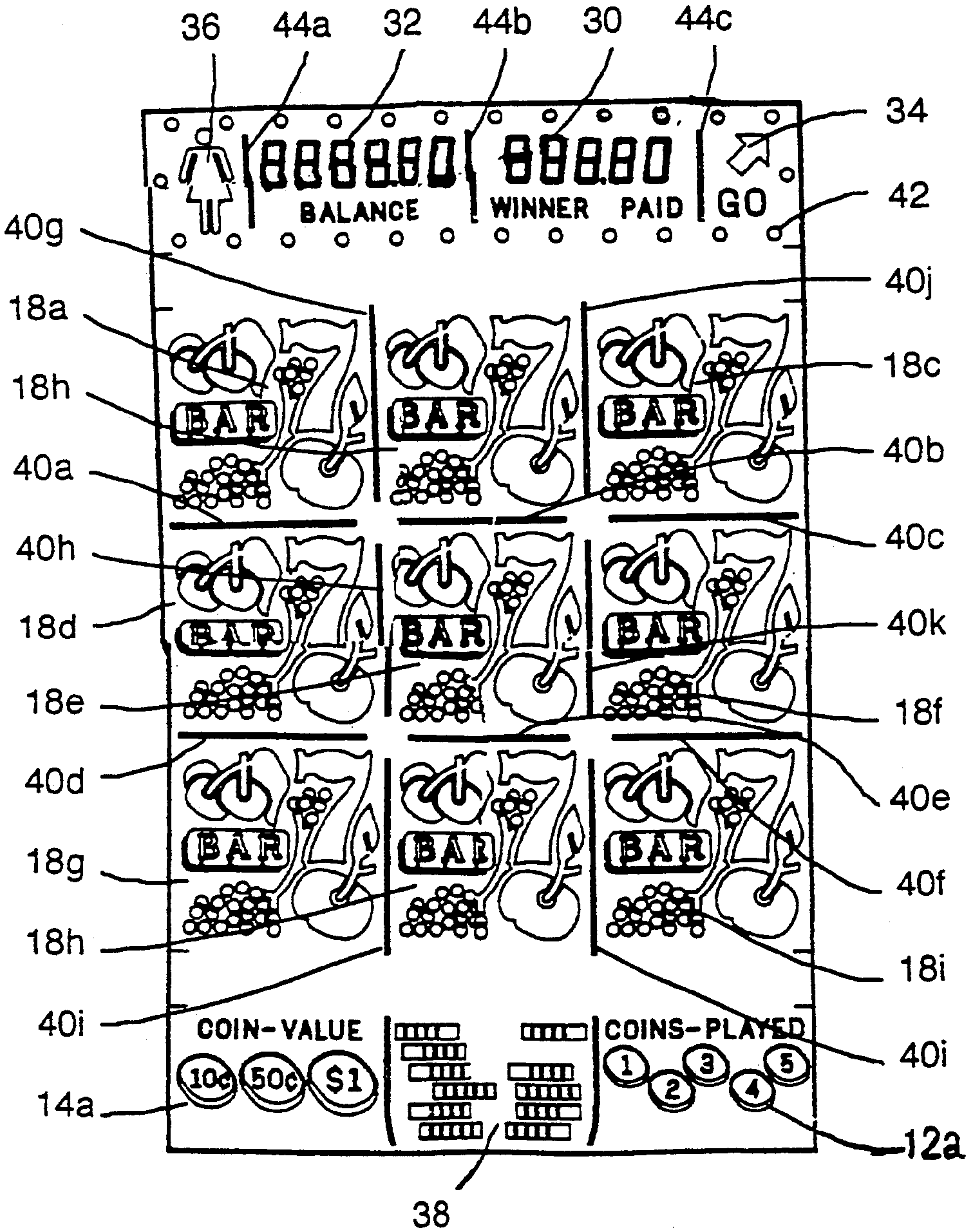
FIG. 5 illustrates the display in each of the portable game units.

The mechanical construction of each portable game unit GU is shown in FIG. 1, its electrical construction is shown in the block diagram of FIG. 4, and its displays are best seen in FIG. 5.

Thus, as shown in FIG. 1, this unit includes a relatively small compact housing 24 suitable for being supported on the foldable table provided each passenger seat. It includes the previously-mentioned operator handle 10, input keys 12, 14 for inputting preselected amounts to be played, display 18, and connector 22 for connecting it to the central computer unit CCU. It also includes a pair of further connectors 26 for connecting the unit to a pair of earphones 28 (FIG. 4) enabling the player to hear various sound effects produced by the portable game unit GU.

Key 12 is used for manually inputting a selected number of lines of symbols to be considered for a winning combination in the respective game, by selecting the number of coins in play per game, and key 14 is used for manually inputting a selected value to be played by selecting the denomination for each coin. For example, if the player wishes to play only ten cents for each game, he would use key 12 for selecting one coin, and key 14 for selecting ten cents; in such case, the total cost to the player for playing the particular game would be ten cents, and only one line of symbols in the display, namely the central line, would be effective in determining whether the player succeeded in producing a winning combination. On the other hand, if the player wishes to risk a larger amount, the player could select via key 12 a larger number of coins in play per game (e.g., up to five coins), and via key 14 a larger denomination (e.g., up to one dollar); in such case, the number of lines corresponding to the number of coins selected would be played and would be considered for winning combinations, the prize awarded for each winning combination being dependent on the coin denomination selected.

The number of coins in play per game as selected by key 12 is shown in a display 12*a* adjacent that key, and the coin denomination as selected by key 14 is shown in display 14*a* adjacent that key. As clearly seen in FIG. 5, the number-of-coins display 12*a* includes five coins, one of which would be energized to indicate the number of lines to be played; and the coin-denomination display 14*a* includes three coins each identified by the denomination (ten cents, fifty cents, one dollar) selected for play for each of the selected lines.

Besides displays 12*a* and 14*a*, and the main display 18 which will be described more particularly below, each portable game unit GU includes the following additional displays: display 30 of the amount won in any particular game; display 32 of the current credit balance available for playing; a "go" display 34 which is energized when the unit is in condition for play by pulling-down handle 10; a display 36 which is energized whenever a condition arises informing the player to call the attendant; and a further display 38, simulating "falling coins, which is energized when a "win" is produced.

The main display 18, as illustrated particularly in FIG. 5, is divided into a plurality of symbol fields 18*a*–18*i* arranged according to a two-dimensional matrix of horizontal and vertical lines. Thus, in the example illustrated, there are nine such symbol fields 18*a*–18*i* arranged according to a matrix of three horizontal rows and three vertical rows. Such an array provides eight different lines of fields, namely three horizontal lines, three vertical lines, and two diagonal lines. Thus, the player theoretically could select up to eight lines of play via key 12; however, in this example, a maxium of only five lines are permitted, these being the three horizontal lines and the two diagonal lines.

Each of the nine symbol fields 18*a*–18*i* includes five possible symbols, namely symbols representing: "apples", "BAR", "grapes", "7", and "orange". Each of these five symbols is in the form of an LCD (liquid crystal display) element, which elements are selectively enegerized to indicate the symbol effective in the respective field.

Each of the nine symbol fields 18*a*–18*i* is separated from the others by bar LCD elements 40*a*–40*l*, which are selectively energized to indicate the line or lines of symbol fields effective during each game played. Thus, if only one line of fields is effective, as selected by key 12, bar elements 40*a*–40*f*, 40*h* and 40*k*, will all be energized to thereby indicate that only the middle horizontal line of symbol fields 18*d*–18*f* is effective; whereas if three lines have been selected, all the bar elements 40*i*–40*l* would be energized. On the other hand, if four or five lines have been selected, all the bar elements 40*a*–40*l* would be energized, and in addition the bar elements indicating the one or two diagonal lines which are also effective, would be indicated by the flashing of the bar elements for the respective diagonal line or lines.

The display fields 30, 32, 34 and 36, at the upper end of the unit are circumscribed by a rectangular array of small LCD lamps 42, and are separated from each other by three vertical LCD bar elements 44*a*, 44*b*, 44*c*.

The electrical construction of each portable game unit GU is shown in the block diagram of FIG. 4. Thus, each unit includes the previously-mentioned connectors 22 for inputting and outputting data with respect to the central computer unit CCU, the operator handle 10, the number-of-coins selector key 12, the coin-value selector key 14, and the displays 18, all controlled by its CPU 16. Each portable game unit GU further includes an interface 50 for inputting and outputting the data via its connector 22, a memory generally designated 52 and an audio generator generally designated 54, all connected to the CPU 16.

Memory 52 includes, besides battery 8 which supplies power to the memory, a RAM (random access memory) 52*a* which stores the initial amount credited to the player and available for playing, as well as the amounts wagered during each game as selected by the number-of-coins key 12 and the coin-value key 14. It further includes a storage device 52*b* in the form of a read-only memory which stores all the winning combinations and the prizes for each combination, as well as various sound effects generated during the playing of the game to simulate the sounds produced in a mechanical-type slot machine, as well as different sounds accompanying different winning combinations. Also provided is an EPROM (erasible programmable read-only memory) 52*c* which stores the program controlling the operation of the CPU 16.

The audio generator section 54 of each portable game unit GU includes a shift register 54*a* connected to the CPU 16 and controlled by a logic circuit 54*b*, a CVSD (continuous voltage slope delta modulator) 54*c*, a low pass filter 54*d*, an amplifier 54*e*, and a tranducer 54*f* connectible to the earphones 28 via the earphone connectors 26. The audio generator 54 reproduces the sounds stored in storage device 52*b* of memory 52, which sounds are heard by the player via earphones 28. These sounds simulate a mechanical-type slot machine, including the sounds of spinning drums, falling coins (display 38), etc.

The number of lines of symbol fields 18*a*–18*i* to be played as selected by the number-of-coins selector key 12, and the amount to be wagered for each line as selected by the coin-value selector key 14, are inputted into the CPU 16 via an input port 56. Also connected to input port 56 are two box microswitches 58*a*, 58*b*, which provide protection against the box or housing of the portable game unit being forceably opened. Thus, if an attempt is made to force open the housing, this will be detected by one of the microswitches 58*a*, 58*b*, which will produce an indication of this, e.g., by energizing the "attendant" signal 36 via input port 56, and which will also block continuation of the game.

A further microswitch 60 (designated "Consing"), is connected to input port 56. This microswitch ensures proper electrical connection to the central computer unit CCU via connectors 20 and 22.

Preferably, both coin selector keys 12 and 14 control the CPU 16 in a cyclical fashion. That is, the depression of the respective key causes the respective display 12*a*, 14*a*, to be selectively energized in a cyclical manner, and when the desired value is represented by the display, the respective key is released, whereby that value is recorded as the selected value.

CPU 16 controls the displays 18 via an output port 62 which transmit the control signals, data pulses, and clock pulses to the displays 18 via a multiplexer 64 and a pair of LCD drivers 66*a*, 66*b*.

Modes of Operation

Figure 6:
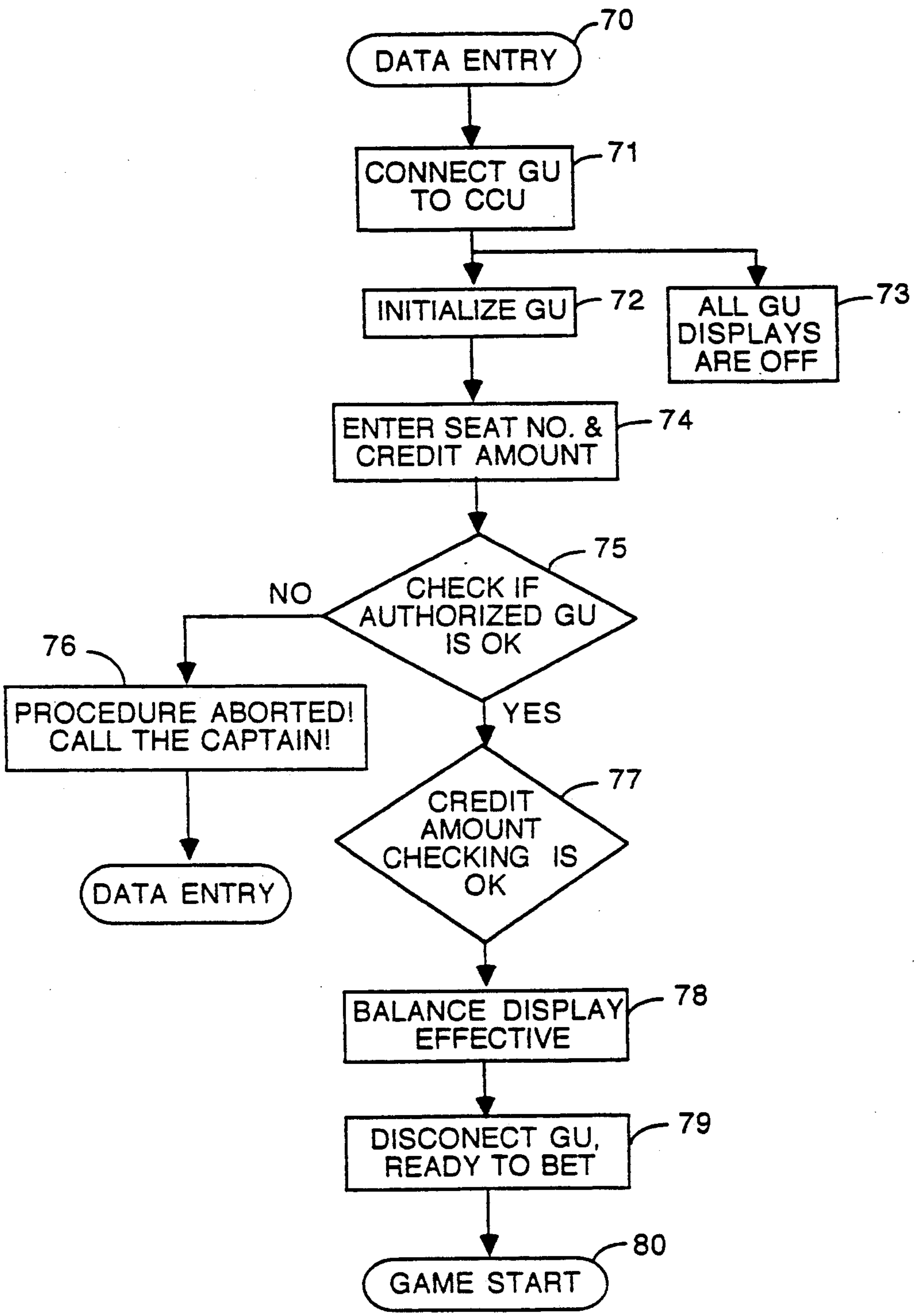
FIG. 6 is a flow diagram illustrating the Crediting Mode of Operation in the illustrated apparatus.

The illustrated apparatus can be operated according to: (1) a Crediting mode of operation, as illustrated in FIG. 6, wherein data is entered into the portable game unit GU from the central computer unit CCU; (2) a Playing mode of operation, as illustrated in FIGS. 7*a* and 7*b* taken together; and (3) a Paying mode of operation, as illustrated in FIG. 8.

As described earlier, in the Crediting mode (FIG. 6), data is entered into the appropriate portable game unit GU by connecting it to the central computer unit CCU (blocks 70, 71). When the portable game unit is thus connected, it is first initialized (block 72) and all its displays are turned off (block 73). Then the attendant enters the seat number and the credit amount purchased by the player (block 74). The central computer unit CCU then checks to see if the portable game unit GU is functioning properly (block 75), and if not the procedure is aborted (block 76). However, assuming that the portable game unit GU is operating properly, a check is made to assure that the amount has been properly credited (block 77), which credit amount is displayed in display 32 (FIGS. 1 and 5). The portable game unit GU is then disconnected from the central computer unit CCU (block 79), and the unit is now ready to be used by the passenger for play (block 80).

Figure 7A:
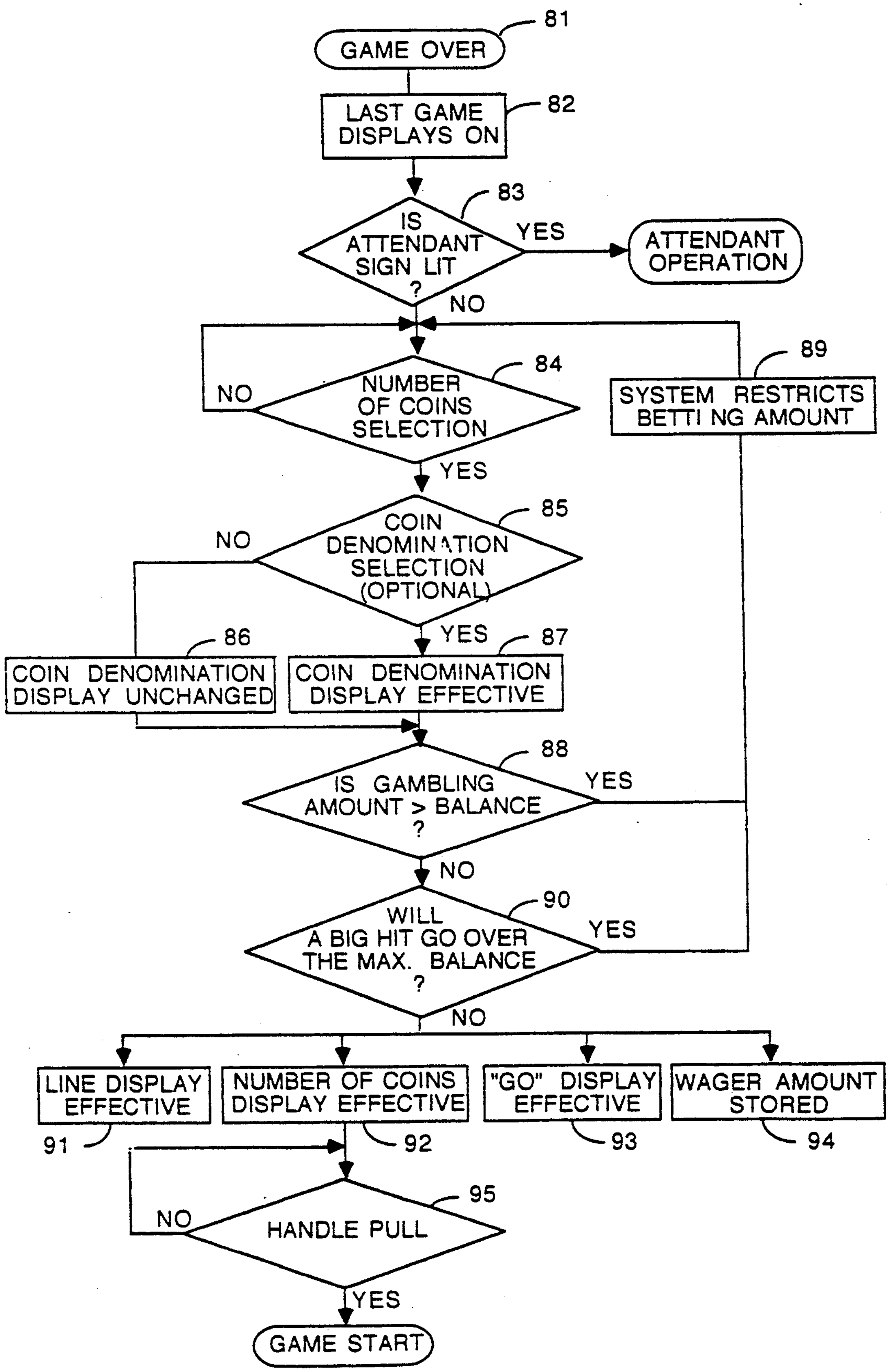
FIGS. 7*a* and 7*b*, taken together, constitute a flow diagram illustrating the Playing Mode of Operation in the illustrated apparatus.
Figure 7B:
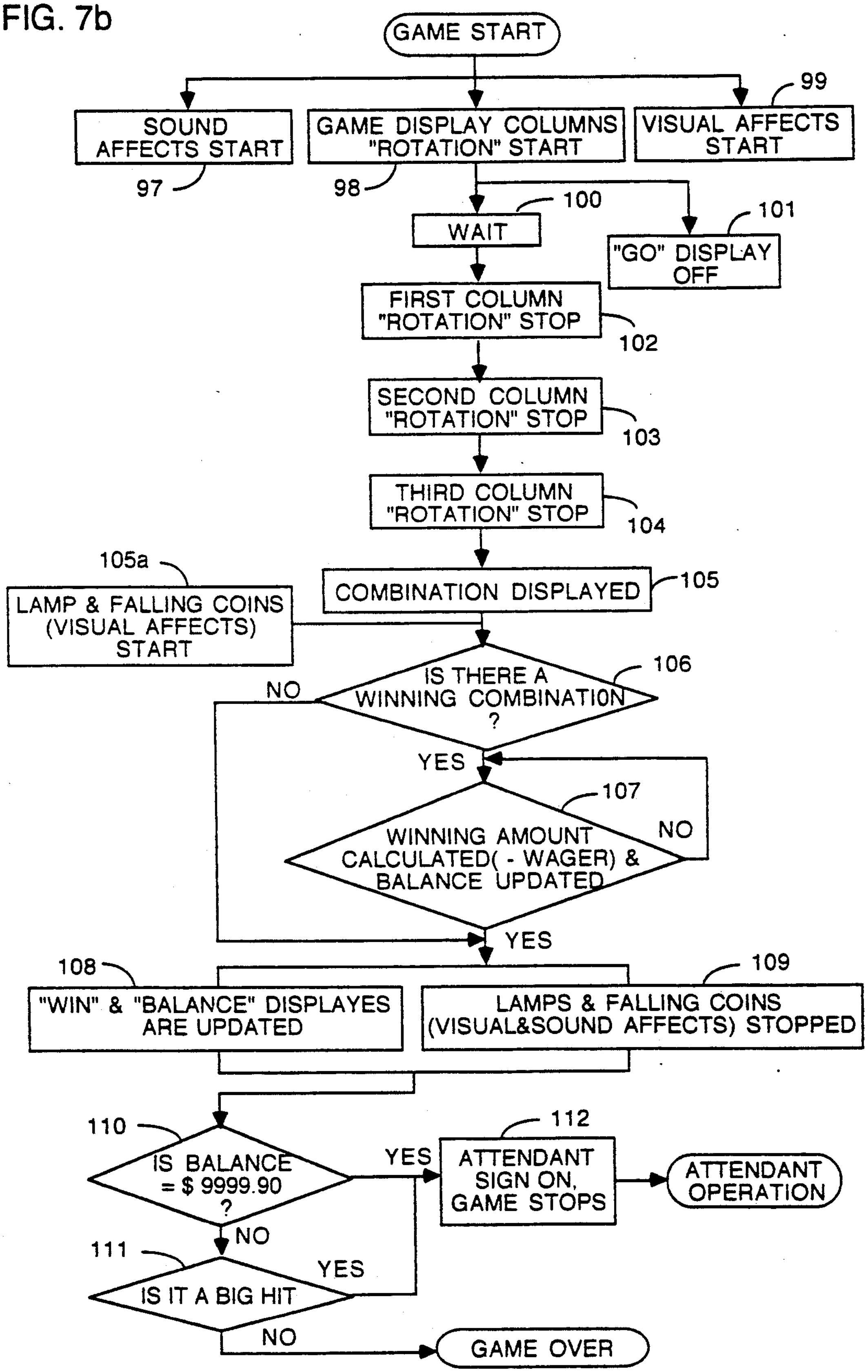
Figure 8:
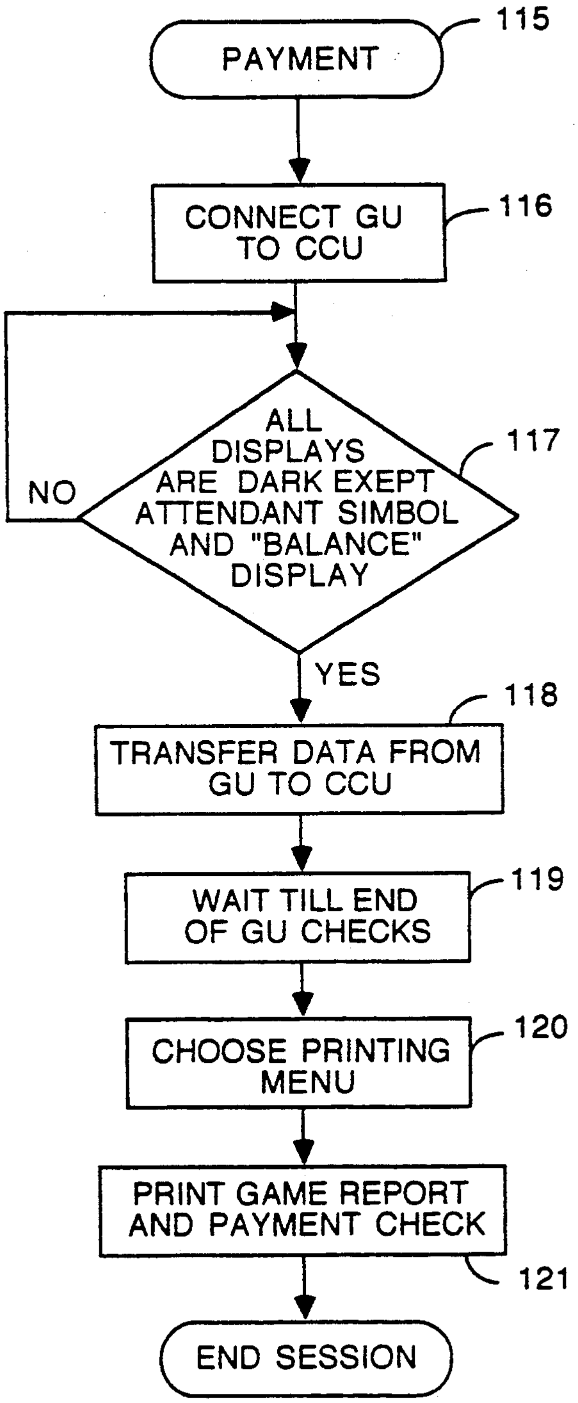
FIG. 8 is a flow diagram illustrating the Paying Mode of Operation.

In the Playing mode, as illustrated in FIGS. 7*a* and 7*b*, the CPU 16 (FIG. 4) in the respective player unit first checks to determine that a game is not in progress (block 81) and that the previous game displays are on (block 82). The unit then checks to see whether the attendant sign 36 is lit (block 83), indicating that the attendant is to be called, e.g., because the pre-purchased credit has been exhausted.

The player then depresses key 12 to select the number of coins to be played in the respective game. As described earlier, the player is entitled to have one line of the symbol fields 18*a*-18*i* considered for a winning combination for each coin selected to be wagered. Thus, if only one coin is to be wagered, then only the middle horizontal line of symbol fields would be made effective to be considered for a winning combination. The player can select in this manner up to five lines, namely the three horizontal lines and the two diagonal lines. Each line selected is indicated by the energization of the bar elements 40*a*-40*h* identifying each selected line, as described above.

After the number-of-coins selection is made via key 12, the coin-denomination is selected via key 14. This, however, is an optional step, since players tend to permit the previous selection also to apply to that game, as indicated by boxes 85, 86 and 87 in FIG. 7*a*.

Next, a check is made to determine whether the amount to be wagered by the player is greater than the credit balance (block 88 If so, the game will not proceed, but the player will have to reduce the amount wagered (block 89), until the amount wagered is covered by the credit balance.

A check is also made to determine whether a big hit will go over a specified maximum balance (block 90), and if so, the game will not proceed until the player reduces the amount wagered so that the big hit will not go over the maximum balance.

When all the foregoing operations have been performed, the selected number of lines to be effective (equalling the number of coins played) should be shown in display 12*a* (block 91); the coin-denomination as selected by key 14 should be shown in display 14*a*; the total amount wagered should be stored in the memory (block 94); and the "go" display 34 should be energized.

At this point, as indicated by the "go" display 34, the player may then pull down handle 10 (block 95), which causes the following operations to occur as illustrated particularly in FIG. 7*b*.

First start the sound effects as stored in storage device 52*b* (FIG. 4) and as reproduced via the CPU 16 in the audio generator 54, which sound effects are heard by the player via the earphones 28. At the same time, the five different symbols in each of the symbol fields 18*a*-18*i* are randomly energized in a manner simulating the rotation of the reels in a conventional slot machine, as indicated by blocks 98 and 99 in FIG. 7*b*. The so-produced visual effects terminate the simulated rotations of the reels one after the other, like in a mechanical-type slot machine, such that the symbols energized at the end of the game indicate the final symbols to be considered in determining whether a winning combination has been produced in any of the played lines. During the waiting period (block 100), the "go" display 34 is turned off (block 101), thereby signalling the player not to start another game. The three rotating columns stop one after the other (blocks 102, 103, 104), until the final combination is displayed (block 105). At this time, the visual and sound effects are also energized according to the combination displayed (block 105*a*); e.g., if there is a winning combination, the falling coins display 38, and sound effects simulating the sounds of falling coins, are produced.

The CPU 16 decides whether a winning combination was produced (block 106). As indicated earlier, all the winning combinations are stored in storage device 52*b* of the memory 52 in the respective portable game unit GU. If a winning combination has been produced (block 107), the credit memory in the respective game unit is updated with the winnings, minus the wagered amount. The "win" display 30 and the "balance" display 32 are appropriately updated (block 108), and the visual and sound effects are terminated (block 109).

A check is then made to determine whether the balance is within a predetermined amount, e.g., $9,999.90 (box 110), or whether there is a "big hit" (box 111); if either has occurred, the attendant sign 36 is energized, which requires the attendant to be called before the unit can be used for playing any further games. If the attendant sign is not energized, the player, having completed one game, may now use the same unit for playing another game.

FIG. 8 illustrates the Paying mode, wherein the player is paid out the amount registered in the credit balance of his game unit GU, as shown in the balance display 32. During this mode, the portable game unit GU is reconnected to the central computer unit CCU (block 116), in which case all displays should be off except the attendant symbol 36 and the "balance" display 32 (block 117).

The balance in the portable game unit GU is then transferred to the central computer unit CCU (block 118), and after a check has been made to assure that this data has been transferred (block 119), the attendant may choose the printing menu for operating the printer 4 (FIG. 2) at the central control unit CCU (block 120). The central computer unit CCU then controls the printer 4 to print the game report, and also the payment check (block 121).

While the invention has been described with respect to one preferred embodiment, it will be appreciated that many other variations, modifications and applications of the invention may be made.

What is claimed is:

1. An electronic gaming apparatus comprising:

a central computer unit, and a plurality of portable game units;

each of said portable game units including: display means having a first display device displaying a plurality of lines of variable symbols; first key means for manually inputting a selected number of lines of symbols to be considered for a winning combination in the respective game; second key means for manually inputting a selected value to be played for each line; a credit memory for storing a predetermined credit available for playing; a rechargeable battery; and computer means for randomly selecting the symbols to be displayed in said plurality of lines of said first display device, for determining any winnings earned by playing the game and for updating the credit memory by the predetermined amount played and by any such winnings; said display means including a second display device for displaying the earnings if any as a result of the game played, and the current amount in the credit memory;

said central computer unit including: a connector for connecting it to a selected one of the portable game units when the game unit is not being played and for disconnecting it from the game unit when the game unit is being played; means for initially crediting the credit memory of a connected portable game unit with a predetermined credit available for playing; and means for reading out the current amount in the credit memory of a connected portable game unit;

said central computer unit being carried on a portable cart which cart also includes a plurality of shelves for supporting said plurality of portable game units, and recharging means for recharging the batteries of the portable game units when supported on said shelves.

2. The apparatus according to claim 1, wherein each of said portable game units simulates a slot machine game.

3. The apparatus according to claim 2, wherein said first display device of each of said portable game units includes a liquid crystal display comprising a plurality of symbol fields arranged according to a two-dimensional matrix of horizontal and vertical lines, each of said symbol fields including a plurality of symbols each including a liquid-crystal display element, and means for selectively energizing said latter elements to indicate the winning combination for the respective line.

4. The apparatus according to claim 3, wherein said plurality of symbol fields are separated by a plurality of horizontal and vertical lines each including a liquid-crystal display element, the latter elements being selectively energized to indicate the line or lines of symbol fields to be considered for a winning combination in the respective game.

5. An electronic gaming apparatus comprising:

a central computer unit, and a plurality of portable game units;

each of said portable game units including: display means having a first display device displaying a plurality of lines of variable symbols; first key means for manually inputting a selected number of lines of symbols to be considered for a winning combination in the respective game; second key means for manually inputting a selected value to be played for each line; a credit memory for storing a predetermined credit available for playing; and computer means for randomly selecting the symbols to be displayed in said plurality of lines of said first display device, for determining any winnings earned by playing the game and for updating the credit memory by the predetermined amount played and by any such winnings; said first key means including a number-of-coins selector which selects the number of coins to be played in the respective game, and therefore the number of lines of said symbols to be considered for a winning combination; said second key means including a coin-denomination selector which selects the amount to be played for each of said lines to be considered for a winning combination; said display means including a second display device for displaying the earnings if any as a result of the game played, and the current amount in the credit memory;

said central computer unit including: a connector for connecting it to a selected one of the portable game units when the game unit is not being played and for disconnecting it from the game unit when the game unit is being played; means for initially crediting the credit memory of a connected portable game unit with a predetermined credit available for playing; and means for reading out the current amount in the credit memory of a connected portable game unit.

6. An electronic gaming machine, comprising:

a plurality of symbol fields each including a plurality of symbols in the form of liquid-crystal display elements each selectively energizable to display one of said symbols;

said plurality of symbol fields being arranged according to a two-dimensional array of horizontal and vertical lines, each of said lines of symbols simulating the symbols of a slot machine game;

and manual operator means manipulatable by the player in each game for randomly energizing the liquid-crystal display elements of one of said symbols in each of said plurality of symbol fields of at least one of said lines.

7. The machine according to claim 6, wherein said symbol fields are separated by a plurality of horizontal and vertical lines each including a liquid-crystal display element selectively energizable to indicate the line or lines of symbol fields to be considered for a winning combination in the respective game.

8. The machine according to claim 6, further including a credit memory for storing a predetermined credit available for playing; and computer means for determining any winnings earned by playing the respective game, and for updating the credit memory by any such winnings.

9. The machine according to claim 8, further including selector means for manually preselecting a predetermined amount to be played during each game, said computer means being effective to update the credit memory also by the amount played during the respective game.

10. The machine according to claim 9, wherein said selector means includes a number-of-coins selector which selects the number of coins to be played, and thereby the number of lines of said symbol fields to be considered for a winning combination in the respective game; and a coin-denomination selector which selects the amount to be played for each of said lines to be considered for a winning combination.

11. Electronic gaming apparatus, comprising:

a wheelable cart dimensioned to be wheeled along the aisle of a passenger aircraft, said wheelable cart carrying a central computer unit, a plurality of portable game units, and recharging means for recharging said portable game units when carried on said cart;

each of said portable game units including a credit memory for storing a predetermined credit available for playing; manual operator means manipulatable by the player for playing the game according to a predetermined amount; computer means for determining any winnings earned by playing the game and for updating the credit memory by the predetermined amount played and by any such winnings; display means for displaying the results of the game played, the earnings if any, and the current amount in the credit memory; a chargeable battery for powering the game unit; and connector means for detachably connecting the game unit to the recharging means of the cart and to the central computer unit on the cart;

said central computer unit including: connector means for detachably connecting it to a selected one of the portable game units; means for initially crediting the credit memory of a connected portable game unit with a predetermined credit available for playing; and means for reading out the current amount in the credit memory of a connected portable game unit.

12. The apparatus according to claim 11, wherein said display means comprises a first display device displaying a plurality of lines of variable symbols representing different winning combinations, and a second display device for displaying the results of the earnings if any as a result of the game played, and the current amount in the credit memory.

13. The apparatus according to claim 12, wherein said first display device comprises a plurality of symbol fields each including a plurality of symbols in the form of liquid-crystal display elements each selectively energizable to display one of said symbols, said plurality of symbol fields being arranged according to a two-dimensional array of horizontal and vertical lines, each of said lines of symbols simulating the symbols of a slot machine game.

14. The apparatus according to claim 13, wherein said symbol fields are separated by a plurality of horizontal and vertical lines each including a liquid-crystal display element selectively energizable to indicate the line or lines of symbol fields to be considered for a winning combination in the respective game.

15. The apparatus according to claim 11, wherein said manual operator means comprises first key means for manually inputting a selected number of lines of symbols to be considered for a winning combination in the respective game played, and second key means for manually inputting a selected value to be played.

16. The apparatus according to claim 15, wherein said first key means includes a number-of-coins selector which selects the number of coins to be played in the respective game, and therefore the number of lines of said symbols to be considered for a winning combination; and said second key means includes a coin-denominator selector which selects the amount to be played for each of said lines to be considered for a winning combination.

17. The apparatus according to claim 16, wherein said display means further includes display devices for displaying the values inputted by said first and second key means.

* * * * *

UNITED STATES PATENT AND TRADEMARK OFFICE

CERTIFICATE OF CORRECTION

PATENT NO. : 5,096,195

DATED : March 17, 1992

INVENTOR(S) : Eliyahu Gimmon

It is certified that error appears in the above-indentified patent and that said Letters Patent is hereby corrected as shown below:

Title page — Column 1, add:
(30) Foreign Application priority data
August 4, 1988 (IL) Israel 87360

Signed and Sealed this

Fourth Day of January, 1994

Attest:

BRUCE LEHMAN

Attesting Officer — Commissioner of Patents and Trademarks